(12) United States Patent
Yanagida et al.

(10) Patent No.: US 11,079,286 B2
(45) Date of Patent: Aug. 3, 2021

(54) TEMPERATURE DETECTION MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Taiji Yanagida, Mie (JP); Shinichi Takase, Mie (JP); Hiroki Shimoda, Mie (JP); Yoshinori Ito, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 336 days.

(21) Appl. No.: 16/310,995

(22) PCT Filed: Jun. 7, 2017

(86) PCT No.: PCT/JP2017/021114
§ 371 (c)(1),
(2) Date: Dec. 18, 2018

(87) PCT Pub. No.: WO2017/221707
PCT Pub. Date: Dec. 28, 2017

(65) Prior Publication Data
US 2019/0178723 A1    Jun. 13, 2019

(30) Foreign Application Priority Data

Jun. 23, 2016 (JP) ............................. JP2016-124499

(51) Int. Cl.
*G01K 1/00*    (2006.01)
*G01K 13/00*   (2021.01)
(Continued)

(52) U.S. Cl.
CPC ................................... *G01K 1/14* (2013.01); *G01K 1/18* (2013.01)

(58) Field of Classification Search
USPC ......................................... 374/208, 163, 147
See application file for complete search history.

(56) References Cited

U.S. PATENT DOCUMENTS

2007/0217480 A1*  9/2007  Lai ........................ G01K 13/08
                                                              374/208
2010/0135357 A1*  6/2010  Chancy .................... G01K 1/18
                                                              374/179
(Continued)

FOREIGN PATENT DOCUMENTS

JP    2009-176601    8/2009
JP    2010-054375    3/2010
(Continued)

OTHER PUBLICATIONS

U.S. Appl. No. 16/311,007 to Taiji Yanagida et al., filed Dec. 18, 2018.
(Continued)

*Primary Examiner* — Mirellys Jagan
(74) *Attorney, Agent, or Firm* — Greenblum & Bernstein, P.L.C.

(57) ABSTRACT

A temperature detection module includes: a temperature sensor; a sensor holder for holding the temperature sensor such that movement is possible in a separation and contact direction in which the temperature sensor is separated from and brought into contact with a measurement target; and a biasing member that is attached to the sensor holder and biases the temperature sensor such that a detection surface (Continued)

comes into contact with a measurement target. The sensor holder includes: a base portion; and an accommodating portion that extends in the separation and contact direction from the base portion and holds the temperature sensor such that movement is possible in the separation and contact direction. The accommodating portion includes a gap that allows inclination of the temperature sensor between the accommodating portion and the temperature sensor.

4 Claims, 11 Drawing Sheets

(51) Int. Cl.
*G01K 1/14* (2021.01)
*G01K 1/18* (2006.01)

(56) References Cited

U.S. PATENT DOCUMENTS

| | | |
|---|---|---|
| 2010/0285340 A1 | 11/2010 | Matsunaga |
| 2019/0041273 A1* | 2/2019 | Shimoda ............. H01M 10/482 |
| 2020/0014083 A1* | 1/2020 | Matsushima ............ G01K 1/14 |
| 2020/0033196 A1* | 1/2020 | Tanaka ................ H01M 2/1077 |

FOREIGN PATENT DOCUMENTS

| | | |
|---|---|---|
| JP | 2011-060675 | 3/2011 |
| JP | 2015-069738 | 4/2015 |

OTHER PUBLICATIONS

Official Communication issued in International Bureau of WIPO Patent Application No. PCT/JP2017/021114, dated Aug. 22, 2017.

* cited by examiner

TEMPERATURE DETECTION MODULE

TECHNICAL FIELD

The technique disclosed in the present specification relates to a temperature detection module.

BACKGROUND ART

Conventionally, the technique disclosed in JP 2011-60675A has been known as a temperature detection module including a temperature sensor. The temperature detection module is attached to a power storage element group having multiple power storage elements.

CITATION LIST

Patent Document

Patent Document 1: JP 2011-60675A

SUMMARY OF INVENTION

Technical Problem

A temperature sensor maintains a state of contact with a measurement target and detects the temperature of the measurement target due to a detection surface being brought into surface contact with the measurement target. For this reason, for example, when the detection surface of the temperature sensor enters a state of being inclined with respect to the measurement target, a problem occurs in which the accuracy of detecting the temperature decreases due to the contact area decreasing.

The technique disclosed in the present specification has been completed based on the foregoing circumstance, and an object thereof is to provide a technique for preventing the temperature detection accuracy from decreasing by maintaining the state of contact between the temperature sensor and the measurement target.

Solution to Problem

The technique disclosed in the present specification is a temperature detection module including: a temperature sensor; a sensor holder for holding the temperature sensor such that movement is possible in a separation and contact direction in which the temperature sensor is separated from and brought into contact with a measurement target; and a biasing member that is attached to the sensor holder and biases the temperature sensor such that a detection surface comes into contact with a measurement target, wherein the sensor holder includes: a base portion; and an accommodating portion that extends in the separation and contact direction from the base portion and holds the temperature sensor such that movement is possible in the separation and contact direction, and the accommodating portion includes a gap that allows inclination of the temperature sensor between the accommodating portion and the temperature sensor.

With this configuration, the temperature sensor can incline by conforming to the inclination of the measurement target. Accordingly, due to the contact state between the temperature sensor and the measurement target being easy to maintain, the detection accuracy of the temperature sensor can be maintained.

The following embodiments are preferable as embodiments of the temperature detection module.

The temperature sensor has a protrusion on an outer peripheral surface, the accommodating portion includes: a pair of side surfaces located on both sides of the temperature sensor; and a stopper wall that is located on a leading end of the side wall, comes into contact with the protrusion of the temperature sensor, and retains the temperature sensor from the accommodating portion, and the gap is provided between the side wall and the protrusion of the temperature sensor. In this configuration, due to the fact that a gap is provided between the side wall and the protrusion of the temperature sensor, when accommodated between the side walls, the temperature sensor can incline by an amount corresponding to the gap.

The side walls of the accommodating portion include guiding grooves that extend in the separation and contact direction, the temperature sensor includes fitting protrusions that fit into the guiding grooves of the accommodating portion, and the gap is also provided between the guiding grooves and the fitting protrusions, in addition to between the side walls and the protrusions. In this configuration, the temperature sensor can move smoothly in a separation and contact direction due to a guiding action performed using the guiding grooves and the fitting protrusions. Also, due to the fact that the gap is also provided between the guiding grooves and the fitting protrusions, it is possible to suppress a case in which the fitting protrusions restrict the inclination of the temperature sensor.

The guiding grooves are provided respectively in the pair of side walls, a pair of the fitting protrusions are provided on both sides of the temperature sensor, and a straight line connecting the pair of fitting protrusions passes through a position separated from the center of the temperature sensor. In this configuration, the temperature sensor can be made smaller compared to the configuration in which the straight line connecting the pair of fitting protrusions passes through the center of the temperature sensor.

Deformation allowance grooves for allowing deformation are provided separately from the guiding grooves on portions of the side walls of the accommodating portion, in order to improve conformability to the inclination of the temperature sensor. In this configuration, due to the fact that a deformation allowance groove is provided in a portion of the wall, the side wall deforms more easily. For this reason, even after the temperature sensor inclines until the gap is filled, the temperature sensor can incline somewhat due to the side surface deforming. Accordingly, the temperature sensor even more easily conforms to the inclination of the surface of the measurement target.

Advantageous Effects of Invention

According to the temperature detection module disclosed in the present specification, it is possible to suppress a case in which the temperature detection accuracy decreases by maintaining the state of contact between the temperature sensor and the measurement target.

DESCRIPTION OF EMBODIMENTS

Embodiment 1

1. Configuration of Temperature Detection Module

Figure 1:
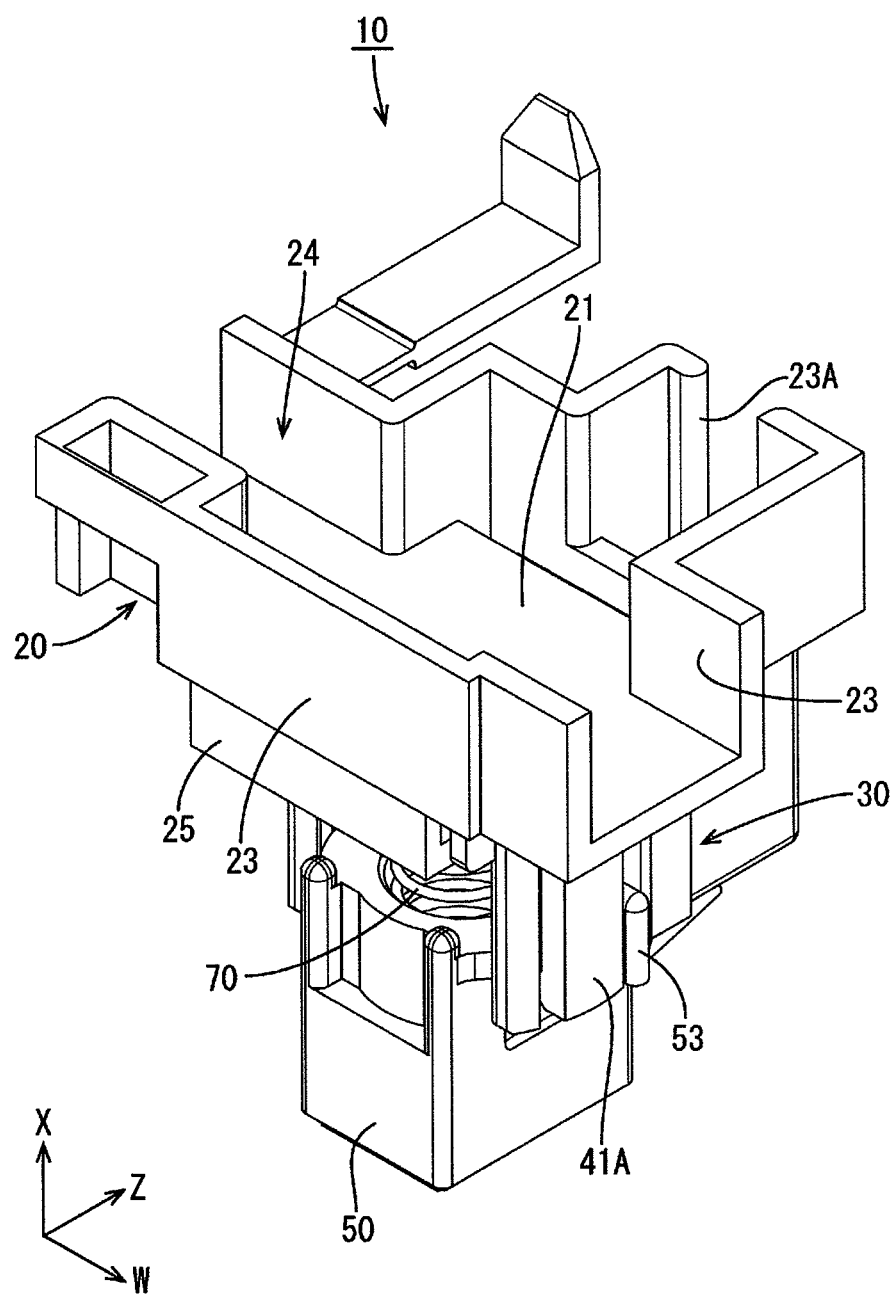
FIG. 1 is a perspective view of a temperature detection module according to Embodiment 1.
Figure 2:
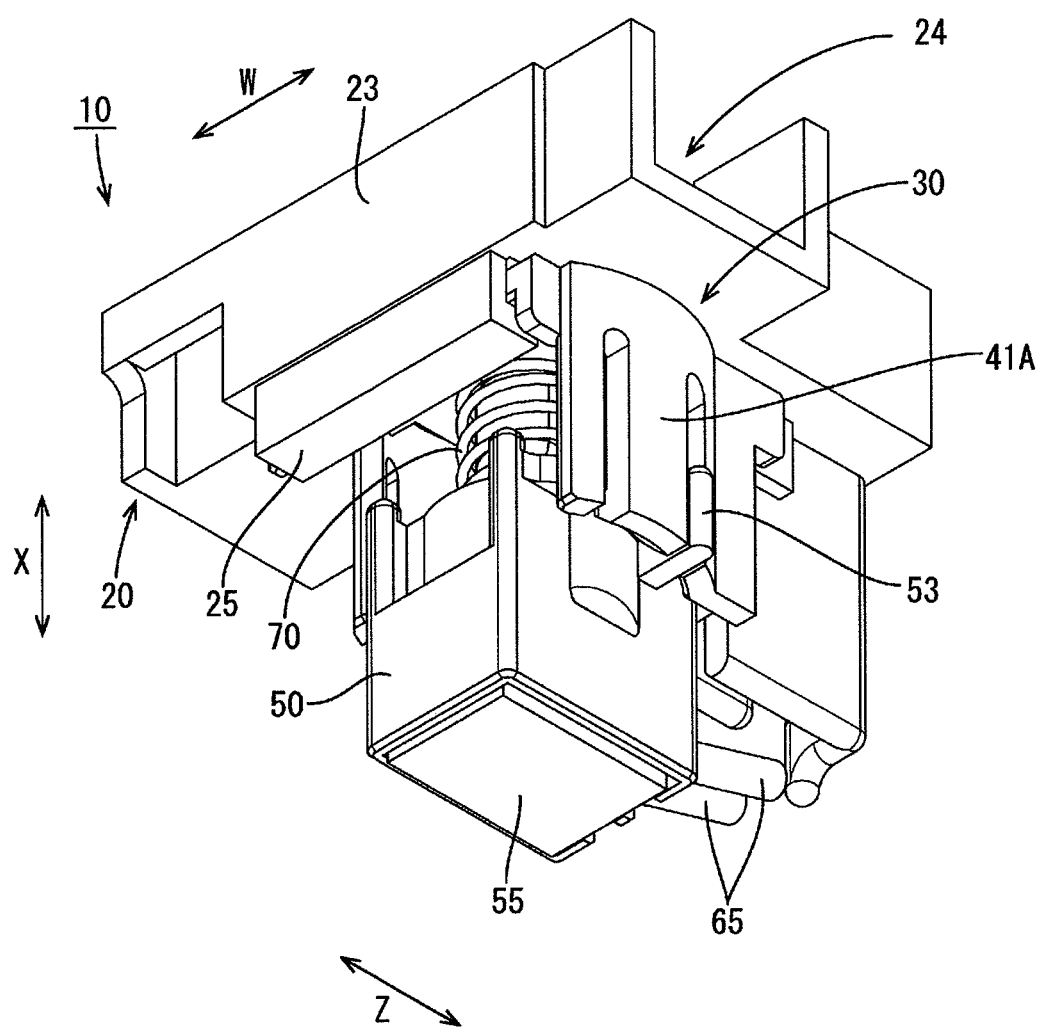
FIG. 2 is a perspective view (viewed from below) of the same temperature detection module.
Figure 3:
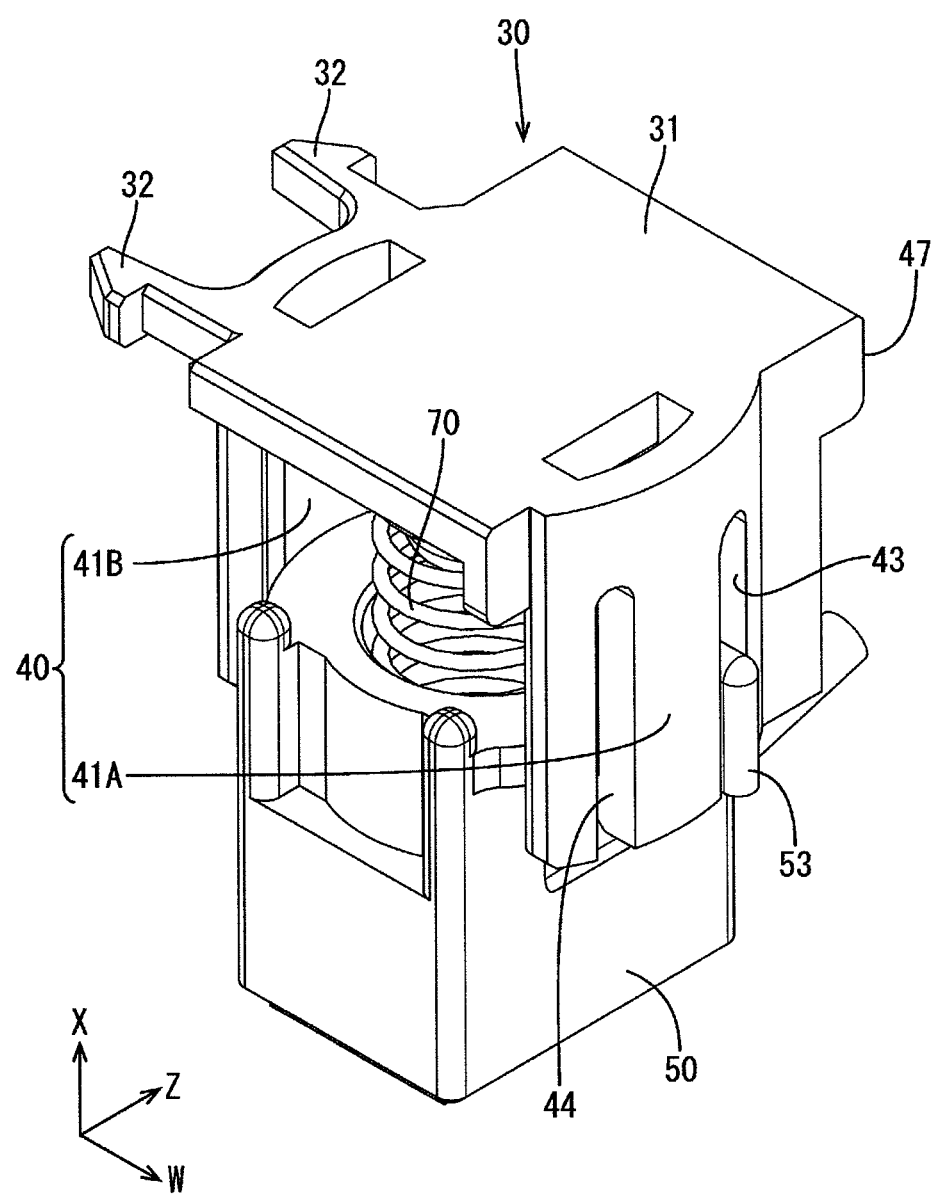
FIG. 3 is a perspective view of the temperature detection module with an electrical wire holder removed.
Figure 4:
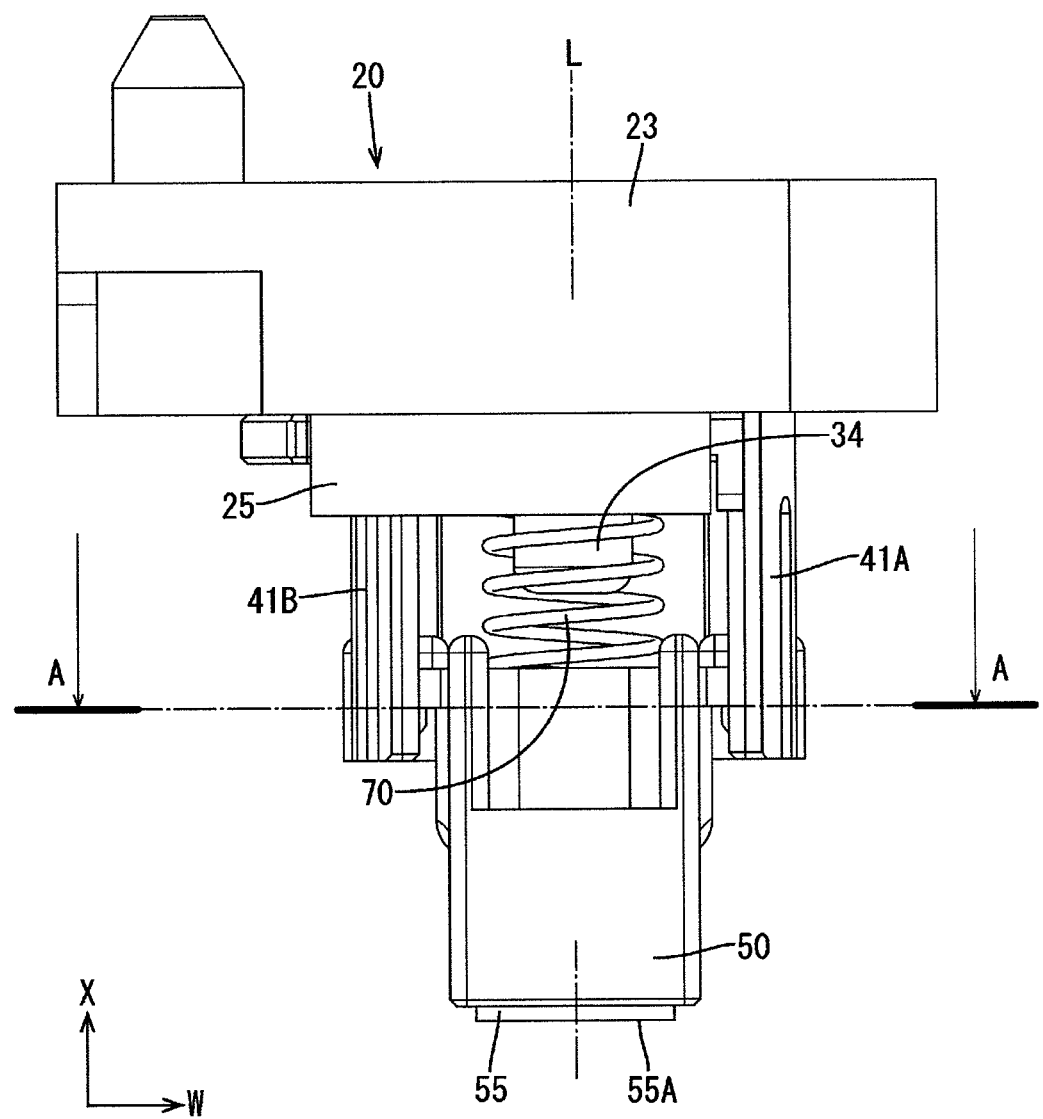
FIG. 4 is a front view of the temperature detection module.
Figure 5:
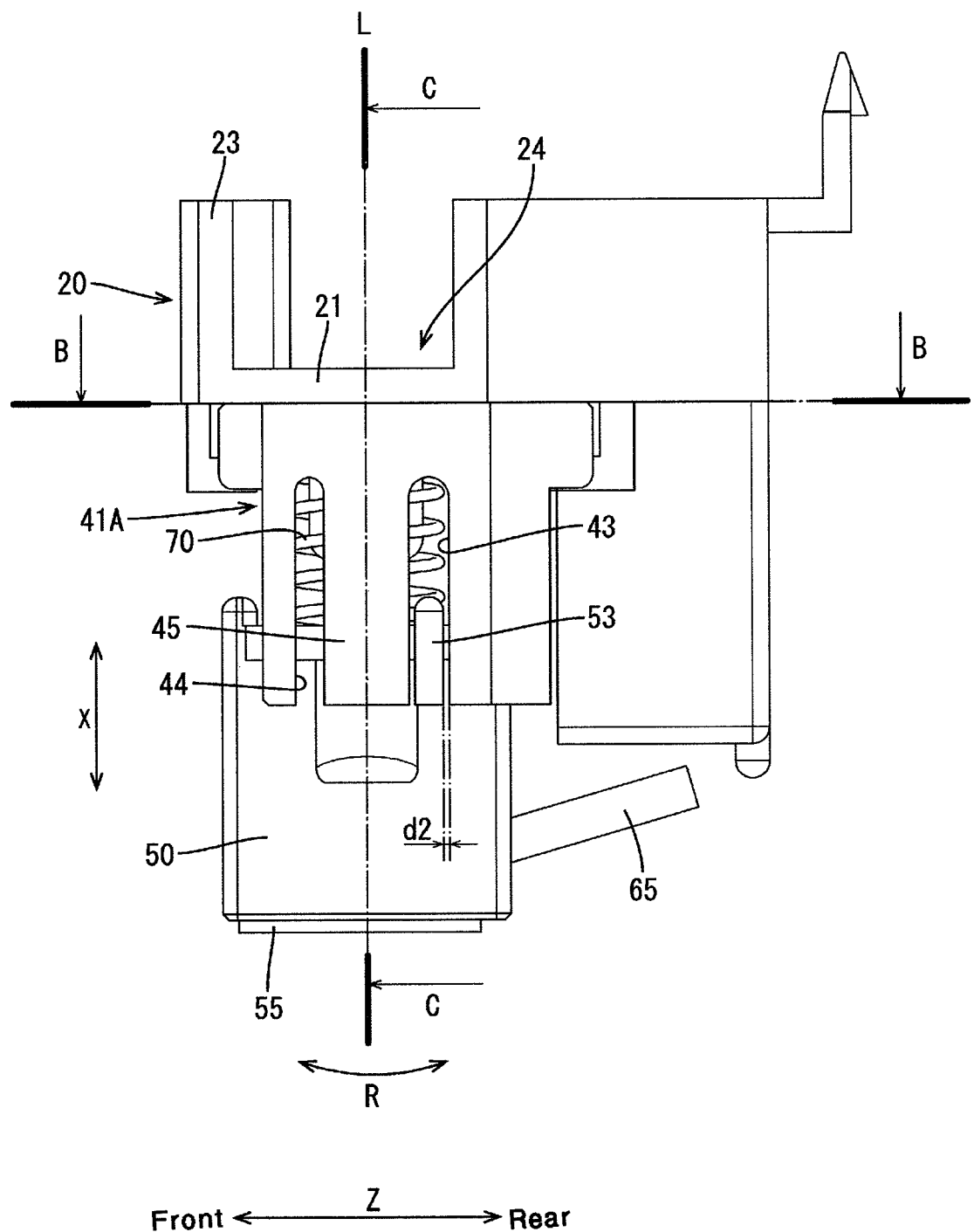
FIG. 5 is a side view of the temperature detection module.

Embodiment 1 of the technique disclosed in the present specification will be described with reference to FIGS. 1 to 8. Note that in the present example, the diagram shows a mode in which the temperature sensor 50 moves in the vertical direction (X direction), is separated from and brought into contact with the measurement target, and has a relationship in which the vertical direction (X direction) corresponds to the "separation and contact direction" of the present invention. Also, in the following description, as shown in FIGS. 1 to 3, the vertical direction is set as the "X direction" and the directions intersecting therewith are the "W direction" and the "Z direction". Also, the left side of FIG. 5 is set as the "front side" and the right side is set as the "rear side".

As shown in FIGS. 1 and 2, the temperature detection module 10 includes an electrical wire holder 20, a sensor holder 30, a temperature sensor 50, and a coil spring 70. The electrical wire holder 20 is made of an insulating synthetic resin. The electrical wire holder 20 includes a base portion 21 and upper walls 23. The upper walls 23 stand upright in the X direction from the outer periphery of the base portion 21. The upper walls 23 are formed along the W direction on both sides in the Z direction and openings are formed at both end sides in the W direction. The region of the electrical wire holder 20 surrounded by the upper walls 23 is an electrical wire passage 24, and electrical wires 65 pulled out from the temperature sensor 50 are routed in the W direction in the electrical wire passage 24 from an insertion groove 23A formed at a portion of the upper walls 23. Also, a coupling wall 25 that is L-shaped in cross section is provided on the lower surface of the electrical wire holder 20. The coupling wall 25 is arranged so as to surround the base portion 31 of the sensor holder 30.

As shown in FIG. 3, the sensor holder 30 is made of an insulating synthetic resin and includes the base portion 31 and an accommodating portion 40 that extends downward from the base portion 31. The sensor holder 30 is fixed to the lower surface of the electrical wire holder 20 with the accommodating portion 40 facing downward.

Specifically, an opening is formed in one surface (on the frontward right side in FIG. 2) of the coupling wall 25 of the electrical wire holder 20, and the base portion 31 can fit inside of the coupling wall 25. Also, as shown in FIG. 3, a pair of lock arms 32 that can be elastically displaced are provided on the base portion 31. Also, due to the lock arms 32 locking onto lock holes 25A formed in the coupling wall 25 of the electrical wire holder 20, the base portion 31 is retained, and the sensor holder 30 is fixed to the electrical wire holder 20 (see FIG. 7).

Figure 6:
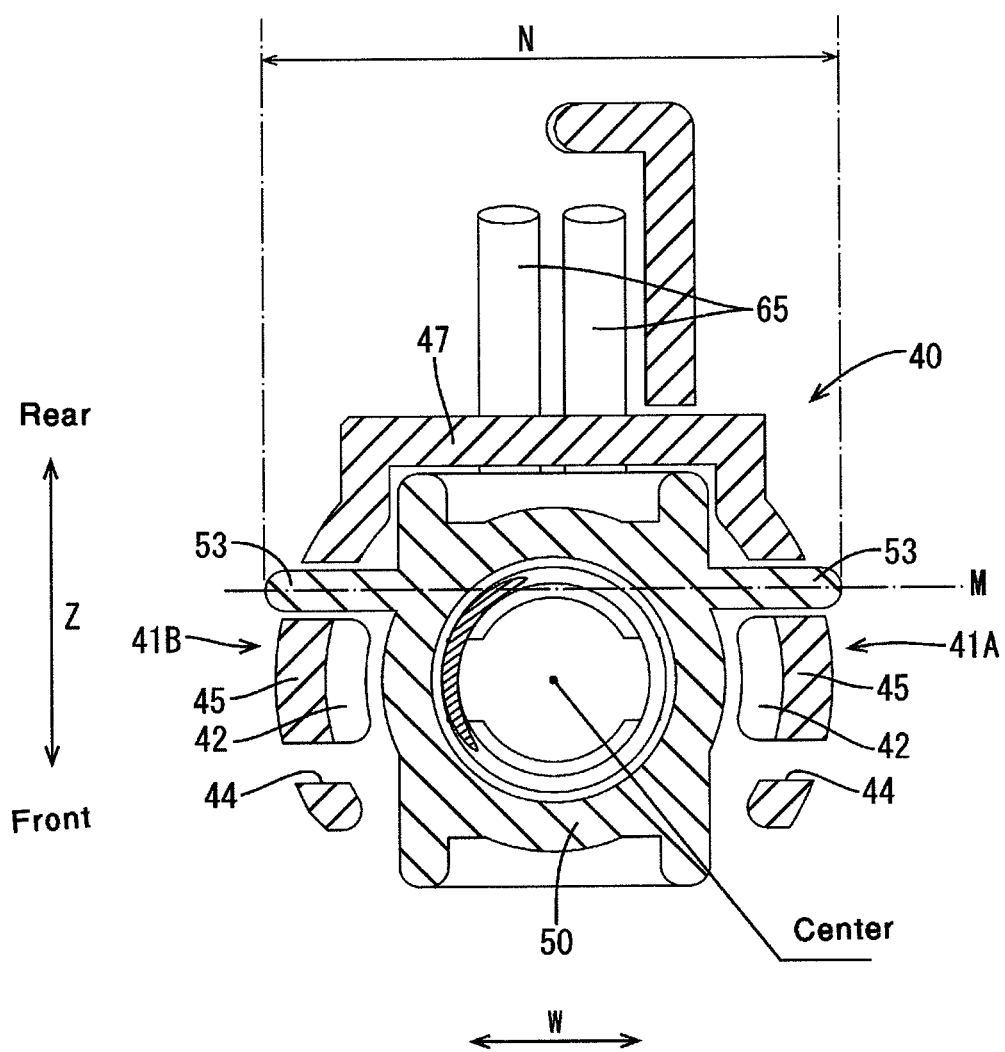
FIG. 6 is a cross-sectional view taken along line A-A in FIG. 4.
Figure 7:
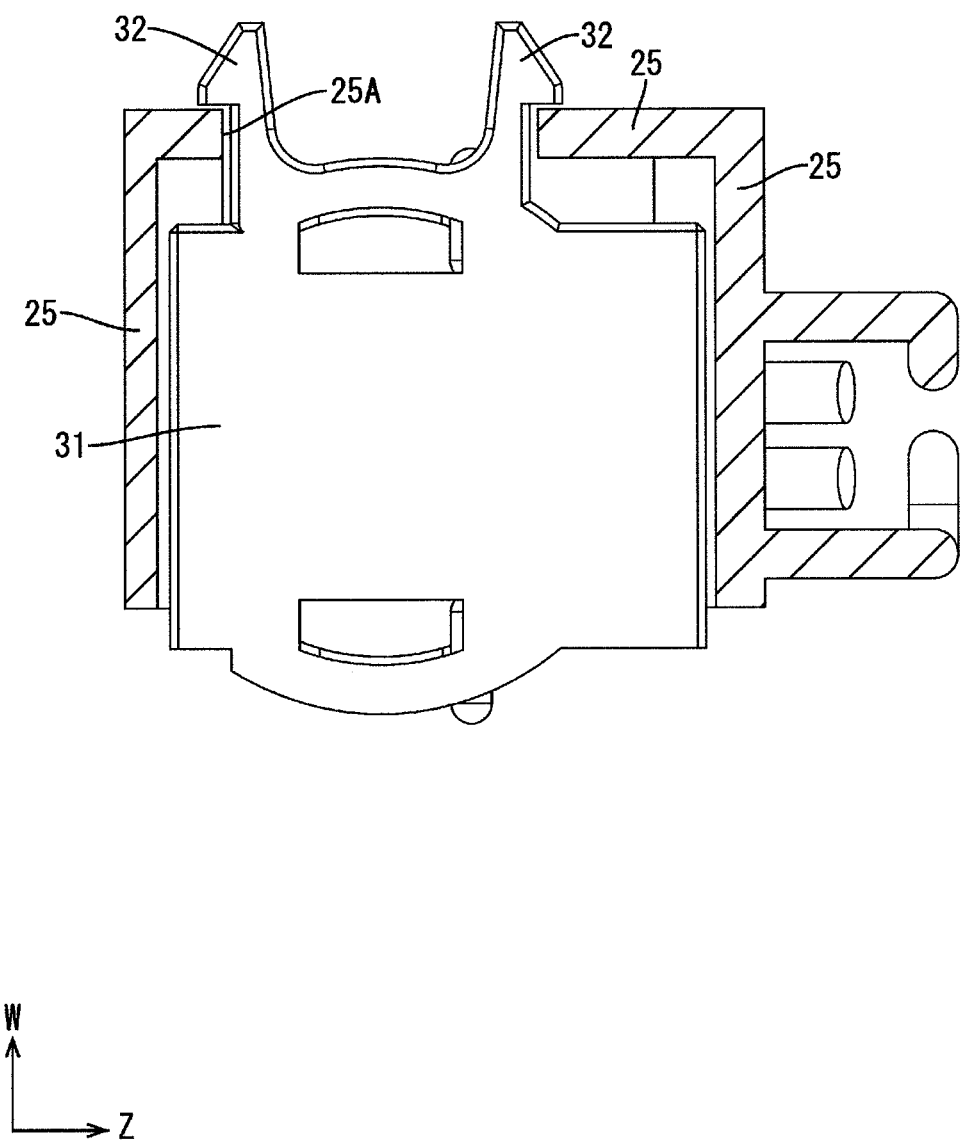
FIG. 7 is a cross-sectional view taken along line B-B in FIG. 5.

The accommodating portion 40 surrounds three sides of the temperature sensor 50, and as shown in FIGS. 3 and 6, the accommodating portion 40 includes a pair of side walls 41A and 41B and a rear surface wall 47. The pair of side walls 41A and 41B are located on both sides in the W direction (both sides in the lateral direction) of the temperature sensor 50 and surround both sides in the W direction (both sides in the lateral direction) of the temperature sensor 50. The cross-sectional shapes of the pair of side walls 41A and 41B are arc-shaped, conforming to the outer peripheral shape of the temperature sensor 50. The rear surface wall 47 is located on the rear side of the temperature sensor 50 (upper side in FIG. 6) and surrounds the rear of the temperature sensor 50. Note that the lower surface and the front surface of the accommodating portion 40 have no walls and are open.

Also, as shown in FIGS. 3 and 6, guiding grooves 43 extending in the X direction are formed penetrating through the wall surfaces of the side walls 41A and 41B. The guiding grooves 43 extend downward from positions near the upper portions of the side surfaces 41A and 41B and cut through the lower ends of the side surfaces 41A and 41B. On the other hand, fitting protrusions 53 with linear shapes that fit into the guiding grooves 43 are provided on the outer peripheral portion of the temperature sensor 50. For this reason, receiving the guiding action of the guiding grooves 43 and the fitting protrusions 53, the temperature sensor 50 can move in the X direction inside of the accommodating portion 40. Note that due to the fact that the guiding grooves 43 and the fitting protrusions 53 are provided in the side walls 41A and 41B on both sides in the W direction, rotation of the temperature sensor 50 can be restricted.

Also, as shown in FIG. 6, the cross-sectional shape of the temperature sensor 50 is circular overall, and a straight line M connecting the pair of fitting protrusions 53 passes through a position separated from the center O of the temperature sensor 50. With this configuration, the temperature sensor 50 can be made smaller compared to a configuration in which the straight line M connecting the pair of fitting protrusions 53 passes through the center O of the temperature sensor 50. Specifically, the entire length N from one fitting protrusion 53 to another fitting protrusion 53 is shorter, and the temperature sensor 50 can be made smaller. Accordingly, the entirety of the temperature detection module 10 can be made smaller.

The coil spring 70 is a spring obtained by winding a spring material into a coil shape. The coil spring 70 is made of metal and is arranged on the inside of the accommodating portion 40 with the axis oriented in the X direction.

Figure 8:
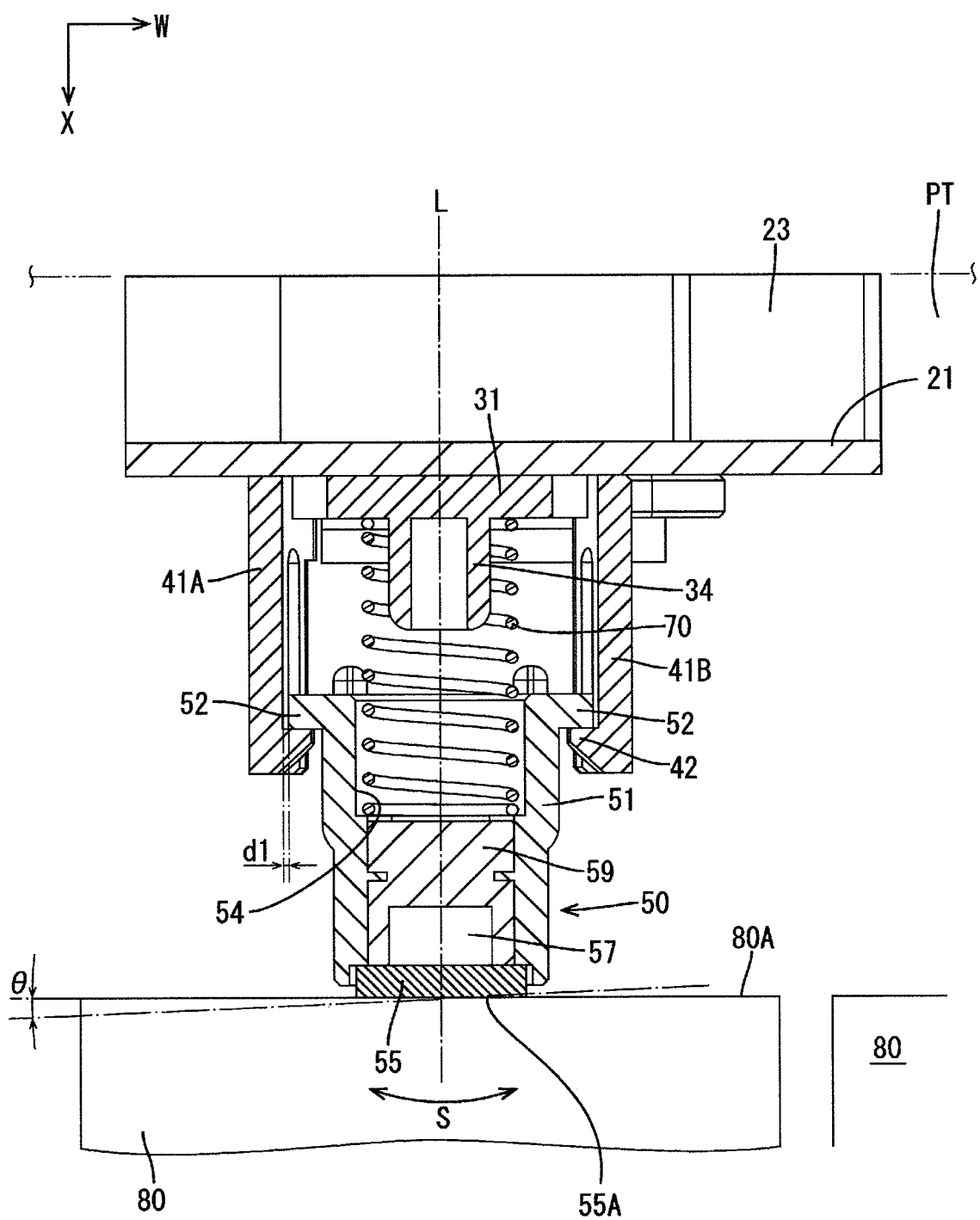
FIG. 8 is a cross-sectional view taken along line C-C in FIG. 5.

To give a detailed description, as shown in FIG. 8, a boss 34 is provided on the lower surface of the base portion 31. On the other hand, a recess 54 is provided on the upper surface side of the temperature sensor 50, the upper end portion of the coil spring 70 is fixed by fitting into the boss 34, and the lower end portion is fixed by being accommodated in the recess 54. The coil spring 70 fulfills a function of biasing the temperature sensor 50 in the X direction (downward). The coil spring 70 is an example of a "biasing member" of the present invention.

Also, as shown in FIG. 8, a pair of protrusions 52 are provided on both sides in the W direction, on the upper end of the outer periphery of the temperature sensor 50. When the temperature sensor 50 reaches the lower end position shown in FIG. 8, the pair of protrusions 52A come into contact with a stopper wall 42 formed on the lower end inner surface of the side walls 41A and 41B, whereby the temperature sensor 50 does not lower further and does not come out of the accommodating portion 40. Note that as shown in FIG. 8, when the temperature sensor 50 has moved to the lower end position, the portions other than the retained upper portion protrude downward from the lower surface of the accommodating portion 40.

As shown in FIG. 8, the temperature sensor 50 includes a case 51 made of an insulating synthetic resin, a contact plate 55, and a temperature detection element 57. The case 51 has a polygonal tube shape that is open in the vertical direction.

The contact plate 55 is made of a material with a high thermal conductivity (e.g., metal, a metal oxide, ceramic, etc.). As the metal constituting the contact plate 55, any metal can be selected as appropriate according to need, such as copper, a copper alloy, aluminum, and an aluminum alloy. In the present embodiment, the contact plate 55 is made of aluminum or an aluminum alloy. The contact plate 55 is arranged on the lower surface of the case, and the lower surface 55A thereof is a detection surface of the temperature sensor 50.

The temperature detection sensor 57 is arranged on the upper surface of the contact plate 55. The temperature detection sensor 57 is constituted by a thermistor, for example. A PTC thermistor or an NTC thermistor can be selected as appropriate as the thermistor.

The case 51 is filled with a filling material 59 in a state in which the temperature detection sensor 57 is accommodated. Specifically, the lower region of the recess 54 in the case is filled. Any filling material 59 can be selected as appropriate according to need as the filling material 59, such as thermoplastic resin, thermosetting resin, and silicone resin.

As shown in FIG. 8, the above-described temperature detection module 10 is attached to a temperature measurement surface 80A of the measurement target (e.g., a power storage element such as a secondary battery) 80 with the contact plate 55 facing downward and the axis L oriented in the X direction. The coil spring 70 biases the temperature sensor 50 in the X direction, that is, in the example of FIG. 8, downward, and therefore the contact plate 55 comes into surface contact with the temperature measurement surface 80A of the measurement target 80. For this reason, the temperature of the measurement target 80 can be detected by the temperature detection module 10.

Note that the temperature detection module 10 is attached to the measurement target 80 by fixing the electrical wire holder 20 to the measurement target 80 using an attachment means. In the example of FIG. 8, the temperature detection module 10 is attached by fixing the electrical wire holder 20 using an engagement means such as a hook to an insulating protector PT attached to a secondary battery 80 included in a battery group.

Incidentally, as shown in FIG. 8, in an ideal attached state, the axis L and temperature measurement surface 80A of the temperature detection module 10 are perpendicular. However, in actuality, due to reasons such as warping occurring in the temperature measurement surface 80A, when the temperature detection module 10 is attached to the measurement target, the temperature measurement surface 80A is not perpendicular to the axis L of the temperature detection module 10 and has an inclination as indicated by the two-dot chain line in FIG. 8 in some cases. If the temperature measurement surface 80A inclines from the state of being perpendicular to the axis L of the temperature detection module 10, the detection surface (lower surface of the contact plate 55) of the temperature sensor 50 is not likely to come into surface contact with the temperature measurement surface 80A, and there is concern that the detection accuracy of the temperature sensor 50 will decrease.

In view of this, the temperature detection module 10 of the present embodiment has a configuration in which the above-described technical problem is solved by providing a gap between the accommodating portion 40 and the temperature sensor 50. Specifically, as shown in FIG. 8, a gap d1 is provided between the inner surfaces of the left and right side walls 41A and 41B and the outer surfaces of the protrusions 52 provided on the upper end of the temperature sensor 50.

By providing the gap d1, the temperature sensor 50 can incline by an amount corresponding to the space of the gap d1 in the accommodating portion 40. That is, the entirety of the temperature sensor 50 can incline in the S direction shown in FIG. 8 with respect to the axis L of the temperature detection module 10.

By using the above-described structure, the temperature sensor 50 inclines in conformity with the inclination of the temperature measurement surface 80A, and therefore the detection surface (lower surface of the contact plate 55) of the temperature sensor 50 more easily comes into surface contact with the temperature measurement surface 80A. For this reason, the state of contact between the detection surface of the temperature sensor 50 and the temperature measurement surface 80A of the measurement target can be maintained, and it is possible to suppress a case in which the detection accuracy of the temperature sensor 50 decreases.

Also, as shown in FIG. 5, a gap d2 is provided also between the guide grooves 43 of the side walls 41A and 41B and the fitting protrusions 53 of the temperature sensor 50. By providing the gap d2, the fitting protrusions 53 can incline by an amount corresponding to the space of the gap d2 in the guiding groove 43.

As described above, the space of the gap d2 allows the temperature sensor 50 to incline in the R direction shown in FIG. 5. That is, the temperature sensor 50 can incline in two directions, namely the S direction and the R direction, and therefore the detection surface (lower surface of the contact plate 55) of the temperature sensor 50 even more easily comes into surface contact with the temperature measurement surface 80A.

Note that the sizes of the gaps d1 and d2 are preferably determined with consideration given to the inclination angle θ of the temperature measurement surface 80A. For example, if it is predicted that the maximum inclination angle of the temperature measurement surface 80A is θmax, it is preferable that the dimensions of the gaps d1 and d2 are set such that the temperature sensor 50 inclines by θmax or more in the S direction and the R direction.

Also, deformation allowance grooves 44 extending in the X direction are provided penetrating through the wall surfaces of the pair of side walls 41A and 41B. As shown in FIG. 5, the deformation allowance grooves 44 are provided side by side in the Z direction with the guiding grooves 43. The deformation allowance grooves 44 extend downward from the position near the upper portion of the side walls 41A and 41B and cut through the lower ends of the side walls 41A and 41B.

The deformation allowance grooves 44 have the same shape as the guiding grooves 43. As shown in FIG. 5, both grooves 43 and 44 are on both sides in the Z direction centered about the axis L of the temperature detection module 10 and are arranged at symmetrical positions.

By providing the deformation allowance grooves 44, the rigidity of the side walls 41A and 41B decreases and the side walls 41A and 41B deform more easily. For this reason, even after the temperature sensor 50 inclines until the gaps d1 and d2 are filled, the temperature sensor 50 can incline somewhat due to the side walls 41A and 41B deforming. For this reason, the temperature sensor 50 even more easily conforms to the inclination of the temperature measurement surface 80A.

Also, as described above, due to the fact that both of the two grooves 43 and 44 cut through the lower ends of the side walls 41A and 41B, the central portion 45 of the side walls 41A and 41B interposed between the two grooves 43 and 44 has a cantilever shape, and thus the central portion 45 warps easily. For this reason, the temperature sensor 50 even more easily conforms to the inclination of the temperature measurement surface 80A. Note that a stopper wall 42 that retains the previously-described temperature sensor 50 is provided at the lower end of the central portion 45.

Also, the deformation allowance grooves 44 are given the same shape as the guiding grooves 43, and moreover, are located at positions that are symmetrical about the axis L of the temperature detection module 10. By doing so, even in a front-rear inverted orientation with respect to the accommodating portion 40 of the sensor module 30, the temperature sensor 50 can be assembled due to the fact that the fitting protrusions 53 fit into the deformation allowance grooves 44.

Next, actions and effects of the present embodiment will be described.

In the temperature detection module 10, the gaps d1 and d2, which allow inclination of the temperature sensor 50, are provided between the accommodating portion 40 and the temperature sensor 50, and even if the temperature measurement surface 80A of the measurement target 80 is not perpendicular to the axis L of the temperature detection module 10 and there is inclination, the temperature sensor 50 easily conforms to the inclination. For this reason, the contact plate 55 of the temperature sensor 50 easily comes into contact with the temperature measurement surface 80A of the measurement target 80. Accordingly, due to the fact that the state of contact between the temperature sensor 50 and the temperature measurement surface 80A can be maintained and the contact area can be ensured, the detection accuracy of the temperature sensor 50 can be maintained.

Embodiment 2

Figure 9:
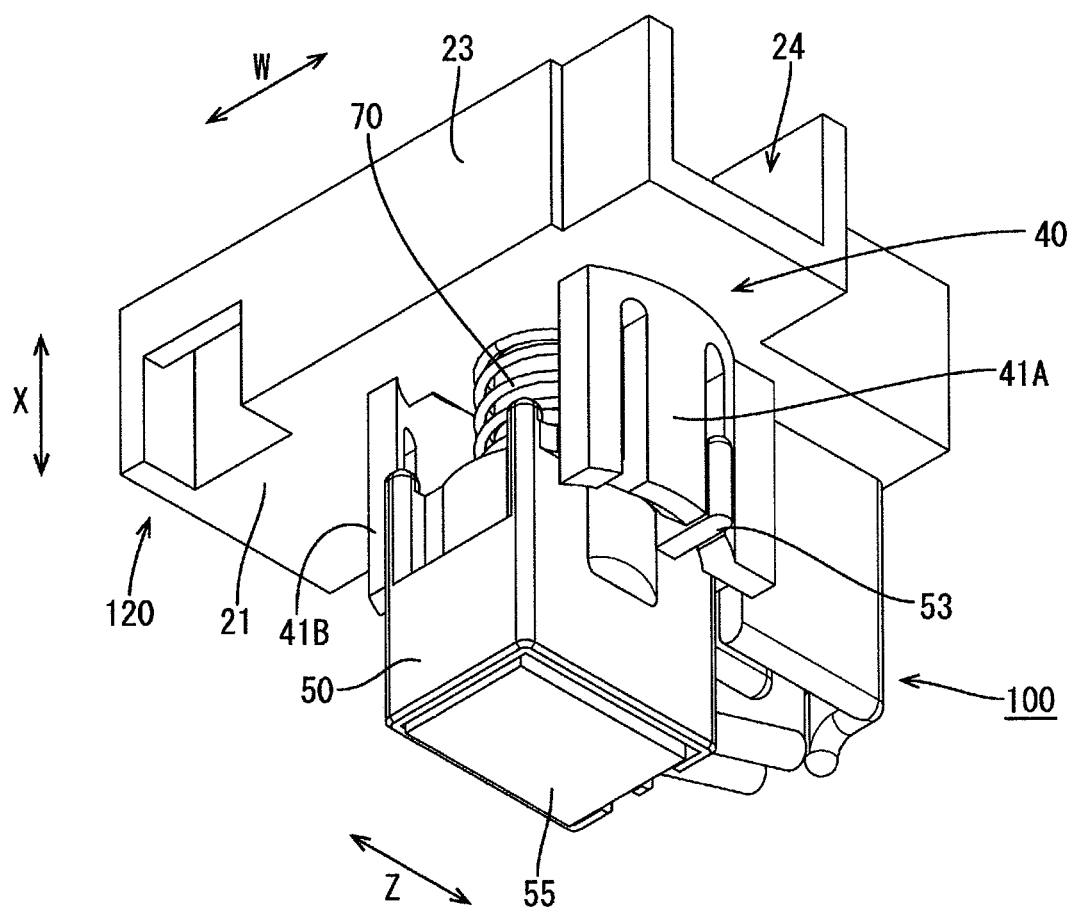
FIG. 9 is a perspective view of a temperature detection module according to Embodiment 2.
Figure 10:
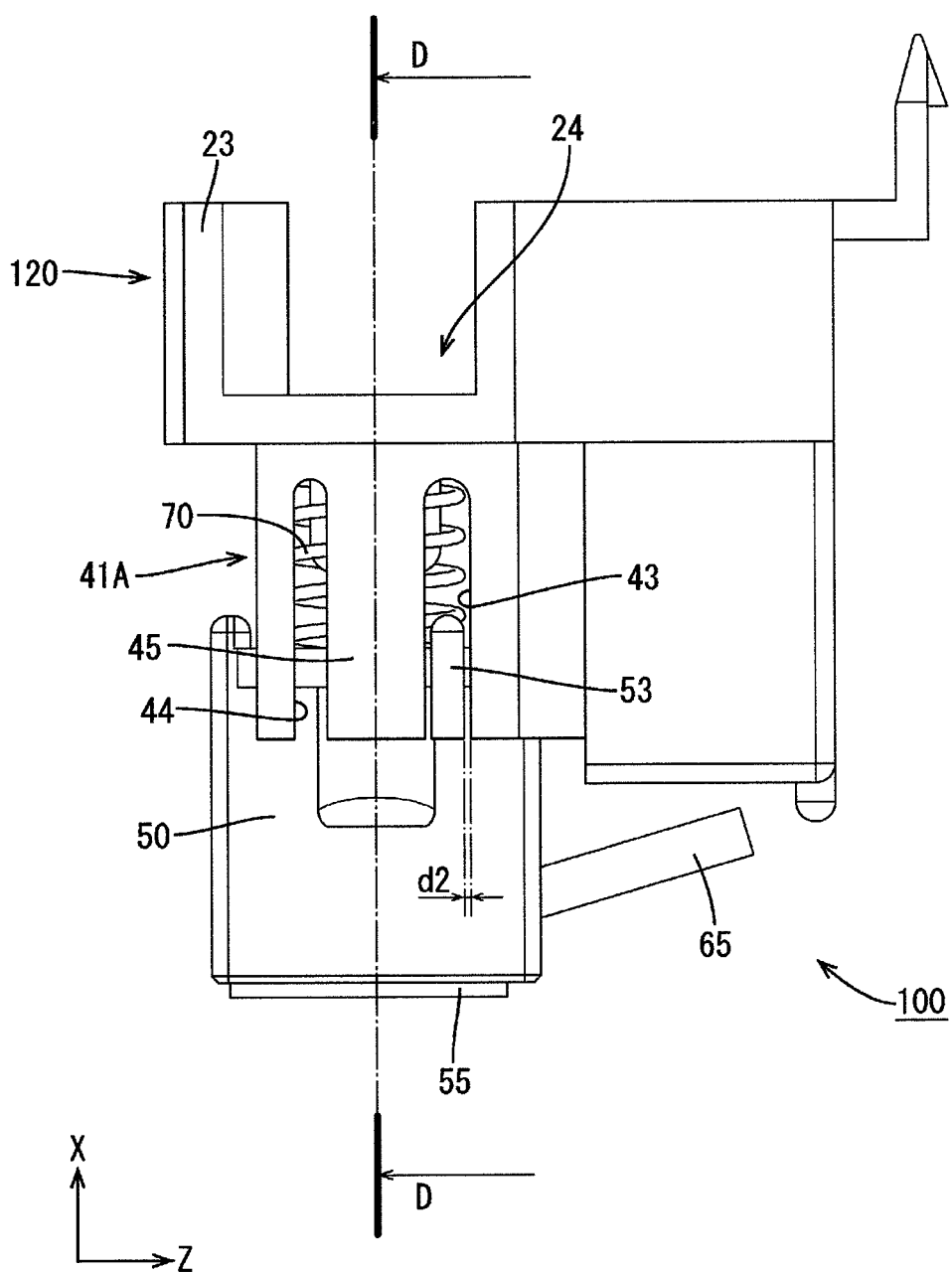
FIG. 10 is a side view of the temperature detection module.

Embodiment 2 of the technique disclosed in the present specification will be described with reference to FIGS. 9 to 11.

In the temperature detection module 10 disclosed in Embodiment 1, the electrical wire holder 20 and the sensor holder 30 are separate members. In the temperature detection module 100 disclosed in Embodiment 2, the electrical wire holder 20 and the sensor holder 30 are integrated. Configurations other than this are the same as those of the temperature detection module 10 of Embodiment 1. Note that the integrated holder corresponds to the "sensor holder" of the present invention.

The temperature detection module 100 includes an integrated holder 120, a temperature sensor 50, and a coil spring 70. The integrated holder 120 has a shape in which the electrical wire holder 20 and the sensor holder 30 are integrated, and includes a base plate 21, an upper wall 23, an accommodating portion 40, and a boss 34. The upper wall 23 stands upward from the outer periphery of the base plate 21 and forms an electrical wire passage 24 on the inner side.

The accommodating portion 40 extends downward from the base portion 21. Also, the boss 34 is provided extending downward from the lower surface of the base portion 21. The accommodating portion 40 and the boss 34 are both formed integrally with the base portion 21. Also, inside of the accommodating portion 40, the coil spring 70 is attached by being fixed to the boss 34 and biases the temperature sensor 50 in the X direction.

Figure 11:
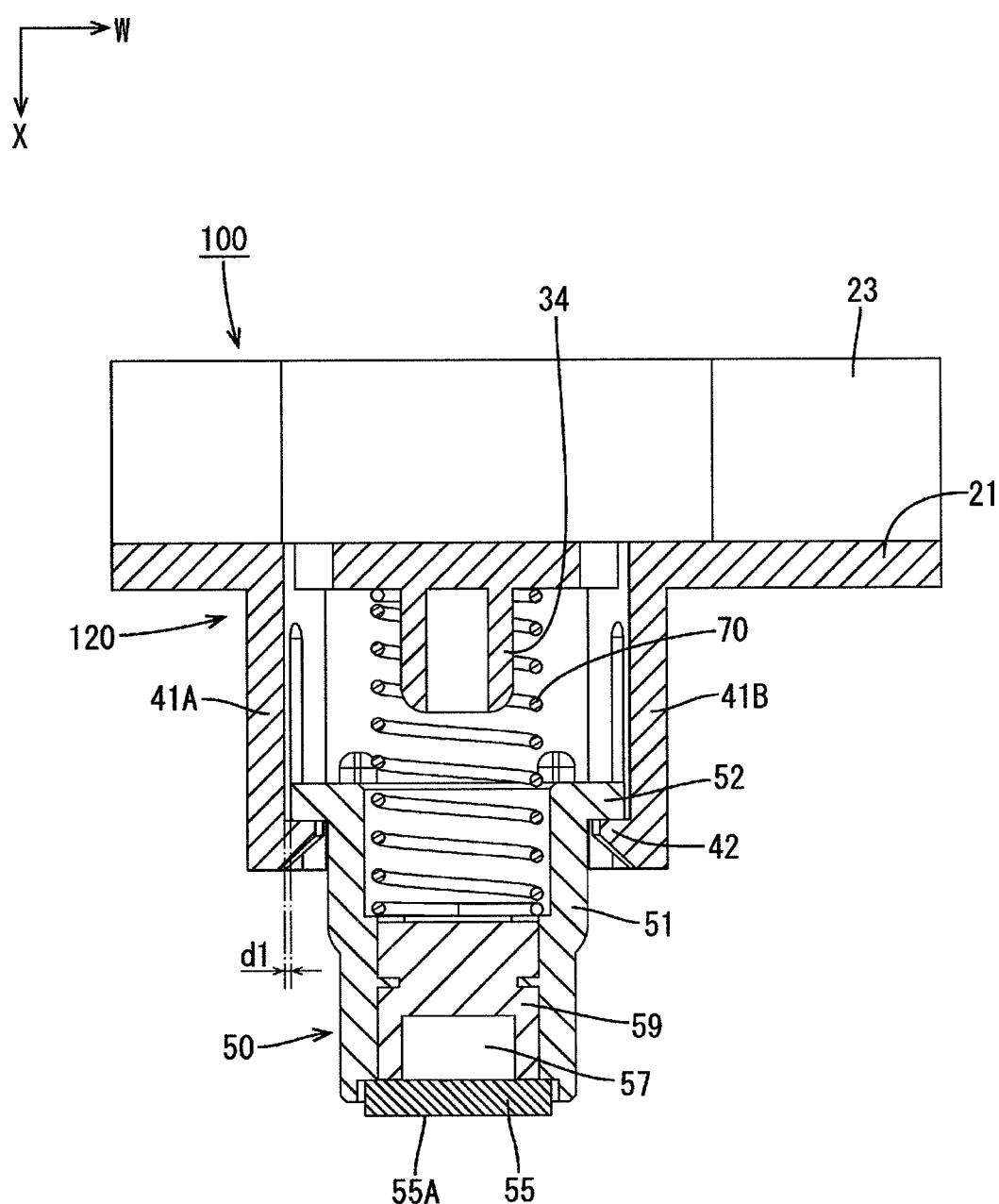
FIG. 11 is a cross-sectional view taken along line D-D in FIG. 10.

In the temperature detection module 100 disclosed in Embodiment 2, a gap d1 is provided between the inner surfaces of the side walls 41A and 41B and the outer surfaces of the protrusions 52 provided on the upper end of the temperature sensor 50, similarly to the temperature detection module 10 of Embodiment 1 (see FIG. 11). Also, the gap d2 is provided between the guiding grooves 43 of the side walls 41A and 41B and the fitting protrusions 53 of the temperature sensor 50 (see FIG. 10).

Due to using this kind of configuration, even if the temperature measurement surface 80A of the measurement target 80 does not intersect the axis L of the temperature detection module 10 and there is inclination, the temperature sensor 50 more easily conforms to the inclination. For this reason, the contact plate 55 of the temperature sensor 50 easily comes into contact with the temperature measurement surface 80A of the measurement target 80.

Also, in the temperature detection module 100, the electrical wire holder 20 and the sensor holder 30 are integrated, and therefore there is an advantage in that the number of components can be reduced compared to the temperature detection module 10 disclosed in Embodiment 1. Note that in Embodiment 2, components in common with Embodiment 1 are denoted by the same reference numerals and redundant description thereof is omitted.

Other Embodiments

The technique described in the present specification is not limited to the embodiments described in the description above and the drawings, and for example, the following embodiments are also included in the technical scope of the technique described in the present specification.

(1) In the present embodiment, an example was indicated in which the gap d1 is provided between the inner surfaces of the side walls 41A and 41B and the protrusions 52 formed in the temperature sensor 50. There is no particular limitation to the example of the embodiment, as long as a gap is provided between the inner surface of the accommodating portion 40 and the outer surface of the temperature sensor 50 corresponding thereto, such that inclination of the temperature sensor 50 is allowed in the accommodating portion.

(2) In the present embodiment, an example was indicated in which the guiding grooves 43 are formed on the side walls 41A and 41B and the fitting protrusions 53 are formed on the temperature sensor 50 in order to guide the movement in the X direction of the temperature sensor 50. The guiding of the movement in the X direction of the temperature sensor 50 is not necessary and the guiding grooves 43 and fitting protrusions 53 may be omitted. It is also possible to leave only the guiding grooves 43 as the deformation allowance grooves 44.

(3) Also, as the temperature detection element 57, there is no limitation to a thermistor, and any element can be selected as appropriate, as long as it can detect the temperature. Also, although the coil spring 70 was shown as an example of a biasing member, any spring that biases the temperature sensor may be selected as appropriate.

LIST OF REFERENCE NUMERALS

10 Temperature detection module
20 Electrical wire holder
30 Sensor holder
31 Base portion
40 Accommodating portion
41A, 41B Side wall
42 Stopper wall
50 Temperature sensor
52 Protrusion
70 Coil spring (biasing member)
80 Measurement target
120 Integrated holder (sensor holder)

The invention claimed is:

1. A temperature detection module comprising:
a temperature sensor;
a sensor holder configured to hold the temperature sensor such that movement is possible in a separation and contact direction in which the temperature sensor is separated from and brought into contact with a measurement target; and
a coil spring that is attached to the sensor holder and biases the temperature sensor such that a detection surface comes into contact with the measurement target,
wherein the sensor holder includes:
   a base portion; and
   an accommodating portion that extends in the separation and contact direction from the base portion and holds the temperature sensor such that movement is possible in the separation and contact direction,
the accommodating portion includes a gap that allows inclination of the temperature sensor between the accommodating portion and the temperature sensor,
the temperature sensor has at least one protrusion on an outer peripheral surface,
the accommodating portion includes:
   a pair of side walls located on both sides of the temperature sensor; and
   at least one stopper wall that is located on a leading end of at least one of the side walls, comes into contact with the at least one protrusion of the temperature sensor, and retains the temperature sensor in the accommodating portion, wherein
the gap is provided between the at least one of the side walls and the at least one protrusion of the temperature sensor.

2. The temperature detection module according to claim 1, wherein
the side walls of the accommodating portion include guiding grooves that extend in the separation and contact direction,
the temperature sensor includes fitting protrusions that fit into the guiding grooves of the accommodating portion, and
the gap is also provided between the guiding grooves and the fitting protrusions.

3. The temperature detection module according to claim 2, wherein
the guiding grooves are provided respectively in the pair of side walls,
a pair of the fitting protrusions are provided on both sides of the temperature sensor, and
a straight line connecting the pair of fitting protrusions passes through a position separated from a center of the temperature sensor.

4. The temperature detection module according to claim 2, wherein
deformation allowance grooves configured to allow deformation are provided separately from the guiding grooves on portions of the side walls of the accommodating portion, in order to improve conformability to the inclination of the temperature sensor.

* * * * *